(12) United States Patent
Lim et al.

(10) Patent No.: US 8,911,124 B2
(45) Date of Patent: *Dec. 16, 2014

(54) BACKLIGHT ASSEMBLY AND DISPLAY APPARATUS HAVING THE SAME

(71) Applicant: Samsung Display Co., Ltd., Yongin (KR)

(72) Inventors: Kyu-Hun Lim, Chungcheongnam-do (KR); Tae-Seok Jang, Seoul (KR); Jeong-Weon Seo, Hwaseong-si (KR); Yoon-Ho Kim, Seoul (KR); Yi-Soo Won, Wonju-si (KR); Won-Jong Ohn, Jeonju-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,604

(22) Filed: Dec. 30, 2013

(65) Prior Publication Data

US 2014/0140093 A1      May 22, 2014

Related U.S. Application Data

(63) Continuation of application No. 13/302,762, filed on Nov. 22, 2011, now Pat. No. 8,616,737.

(30) Foreign Application Priority Data

Jun. 16, 2011   (KR) .................... 10-2011-0058554

(51) Int. Cl.
*F21V 29/00*   (2006.01)
*F21V 8/00*    (2006.01)
*G02F 1/1335*  (2006.01)

(52) U.S. Cl.
CPC ............ *G02B 6/0081* (2013.01); *G02B 6/0073* (2013.01); *G02B 6/0085* (2013.01); *G02F 2001/133628* (2013.01); *G02B 6/0035* (2013.01); *G02B 6/0053* (2013.01); *G02B 6/005* (2013.01); *G02B 6/0068* (2013.01)
USPC .......................... 362/373; 362/632; 362/633

(58) Field of Classification Search
USPC ......... 362/373, 294, 547, 97.1; 257/712, 716; 165/75
See application file for complete search history.

(56) References Cited

U.S. PATENT DOCUMENTS

| | | | | |
|---|---|---|---|---|
| 6,871,979 B2 * | 3/2005 | Mai | ............... | 362/241 |
| 7,207,709 B2 * | 4/2007 | Chuang et al. | ............... | 362/633 |
| 7,275,842 B2 * | 10/2007 | Wang et al. | ............... | 362/373 |
| 7,621,666 B2 * | 11/2009 | Han | ............... | 362/633 |
| 8,616,737 B2 * | 12/2013 | Lim et al. | ............... | 362/373 |
| 2008/0055534 A1 | 3/2008 | Kawano | | |

FOREIGN PATENT DOCUMENTS

| | | |
|---|---|---|
| KR | 1020060024051 A | 3/2006 |
| KR | 1020080035105 A | 4/2008 |
| KR | 1020090122054 A | 11/2009 |

* cited by examiner

*Primary Examiner* — Ali Alavi

(74) *Attorney, Agent, or Firm* — Innovation Counsel LLP

(57) ABSTRACT

A backlight assembly includes a light guiding plate, a light source and a bottom receiving plate. The light source is disposed at a first side of the light guiding plate. The bottom receiving plate includes a bottom surface and a side wall to form a receiving space in which at least a portion of the light guiding plate is placed. The bottom surface is smaller than a lower surface of the light guiding plate and has a plurality of openings formed through the bottom surface. The side wall extends from the bottom surface.

20 Claims, 6 Drawing Sheets

BACKLIGHT ASSEMBLY AND DISPLAY APPARATUS HAVING THE SAME

CROSS-REFERENCE TO RELATED APPLICATION

This application is a continuation of U.S. patent application Ser. No. 13/302,762 filed on Nov. 22, 2011, which claims priority under 35 U.S.C. §119 to Korean Patent Application No. 10-2011-0058554, filed on Jun. 16, 2011, in the Korean Intellectual Property Office (KIPO), the contents of which are herein incorporated by reference in their entireties.

BACKGROUND OF THE PRESENT INVENTION

1. Field of the Present Invention

Example embodiments of the present invention relate generally to flat panel displays. More particularly, example embodiments of the present invention relate to a backlight assembly for a flat panel display and a display apparatus having the backlight assembly.

2. Discussion of the Related Art

Generally, a display apparatus includes a display panel displaying an image and a backlight assembly supplying light to the display panel. The backlight assembly may include various kinds of light sources. For example, many recent backlights employ arrays of light emitting diodes (LEDs).

The backlight assembly is classified as an edge-illumination type or a direct-illumination type, according to the position of its light source. In the edge-illumination type, a light guiding plate for guiding the light is disposed adjacent to the light source. For example, in a display apparatus used for a slim PC, a bottom receiving plate receiving a light guiding module is smaller than the light guiding module to decrease a total width of a frame, so that the light source and the light guiding plate are partially received in the bottom receiving plate.

Generally, the bottom receiving plate may include a metal. Heat generated from the light source is conducted to the bottom receiving plate. However, the bottom receiving plate only partially receives the light guiding module, so that temperature of the light guiding module is different in areas in which the bottom receiving plate is disposed, areas compared to areas in which the bottom receiving plate is not disposed. Characteristics of the display panel are affected by the temperature, so that brightness changes according to changes of the temperature. For example, an area of the display panel having relatively high temperature has a relatively high brightness. Thus, the difference in temperature between the area in which the bottom receiving plate is disposed and the area in which the bottom receiving plate is not disposed causes a brightness difference, so that a defect such as a stains or other undesirable visual effects occurs.

SUMMARY OF THE PRESENT INVENTION

Example embodiments of the present invention provide a backlight assembly configured to more efficiently emit heat and to display a more uniform brightness.

Example embodiments of the present invention also provide a display apparatus having the backlight assembly.

According to an example embodiment of the present invention, a backlight assembly includes a light guiding plate, a light source and a bottom receiving plate. The light source is disposed at a first side of the light guiding plate. The bottom receiving plate includes a bottom surface and a side wall to form a receiving space in which at least a portion of the light guiding plate is placed. The bottom surface is smaller than a lower surface of the light guiding plate and has a plurality of openings formed through the bottom surface. The side wall extends from the bottom surface.

In an example embodiment, each of the openings may have substantially the same size and shape, and be uniformly arranged through the bottom receiving plate.

In an example embodiment, sizes of each of the openings may decrease with distance from the light source.

In an example embodiment, each of the openings may have substantially the same size and shape, and be irregularly arranged through the bottom receiving plate.

In an example embodiment, a density of the openings may decrease with distance from the light source.

In an example embodiment, a distance between the openings may increase with distance from the light source.

In an example embodiment, ones of the openings may have sizes different from each other and have a substantially same shape.

In an example embodiment, sizes of each of the openings may decrease with distance from the light source.

In an example embodiment, each opening may have one of a quadrilateral shape, a triangular shape, a circular shape and an elliptic shape.

In an example embodiment, the side wall of the bottom receiving plate may include a first side wall and a second side wall oriented substantially parallel to the first side wall.

In an example embodiment, the bottom receiving plate does not cover the first side of the light guiding plate.

In an example embodiment, the bottom receiving plate may receive a central portion of the light guiding plate.

In an example embodiment, the backlight assembly may further include a fixing film maintaining positions of the light source and a reflecting plate.

In an example embodiment, the side wall of the bottom receiving plate may include a first side wall, a second side wall, and a third side wall. The second side wall may be oriented substantially parallel with the first side wall. The third side wall may face the first side of the light guiding plate.

In an example embodiment, at least portions of the light source and the first side of the light guiding plate may be positioned in the receiving space.

In an example embodiment, an area of the bottom surface of the bottom receiving plate may be less than a half of an area of the lower surface of the light guiding plate.

In an example embodiment, the backlight assembly may further include an optical sheet and a reflecting plate. The optical sheet may be disposed over the light guiding plate. The reflecting plate may be disposed between the light guiding plate and the bottom surface of the bottom receiving plate.

In an example embodiment, the backlight assembly may further include a bottom mold disposed between the reflecting plate and the bottom receiving plate and supporting a boundary of the reflecting plate.

According to still another example embodiment of the present invention, a display apparatus includes a display panel configured to display an image, a backlight assembly and a middle mold. The backlight assembly includes a light guiding plate, a light source disposed at a first side of the light guiding plate, and a bottom receiving plate including a bottom surface and a side wall to form a receiving space in which at least a portion of the light guiding plate is placed. The bottom surface is smaller than a lower surface of the light guiding plate and has a plurality of openings formed through the bottom surface. The middle mold is disposed between the display panel and the backlight assembly, and supports the display panel.

According to the present invention, the backlight assembly of a display apparatus includes a bottom receiving plate with a bottom surface through which a plurality of openings is formed, so that heat generated from the light source may be more efficiently dissipated and more uniform brightness of the display apparatus may be obtained.

In addition, the light guiding plate and etc. are efficiently received and supported by the bottom receiving plate, and total size and weight of the display apparatus may be reduced at the same time.

BRIEF DESCRIPTION OF THE DRAWINGS

The above and other features of the present invention will become more apparent by describing in detail example embodiments thereof with reference to the accompanying drawings, in which.

DETAILED DESCRIPTION OF EXAMPLE EMBODIMENTS

Hereinafter, the present invention will be explained in detail with reference to the accompanying drawings.

Figure 1:
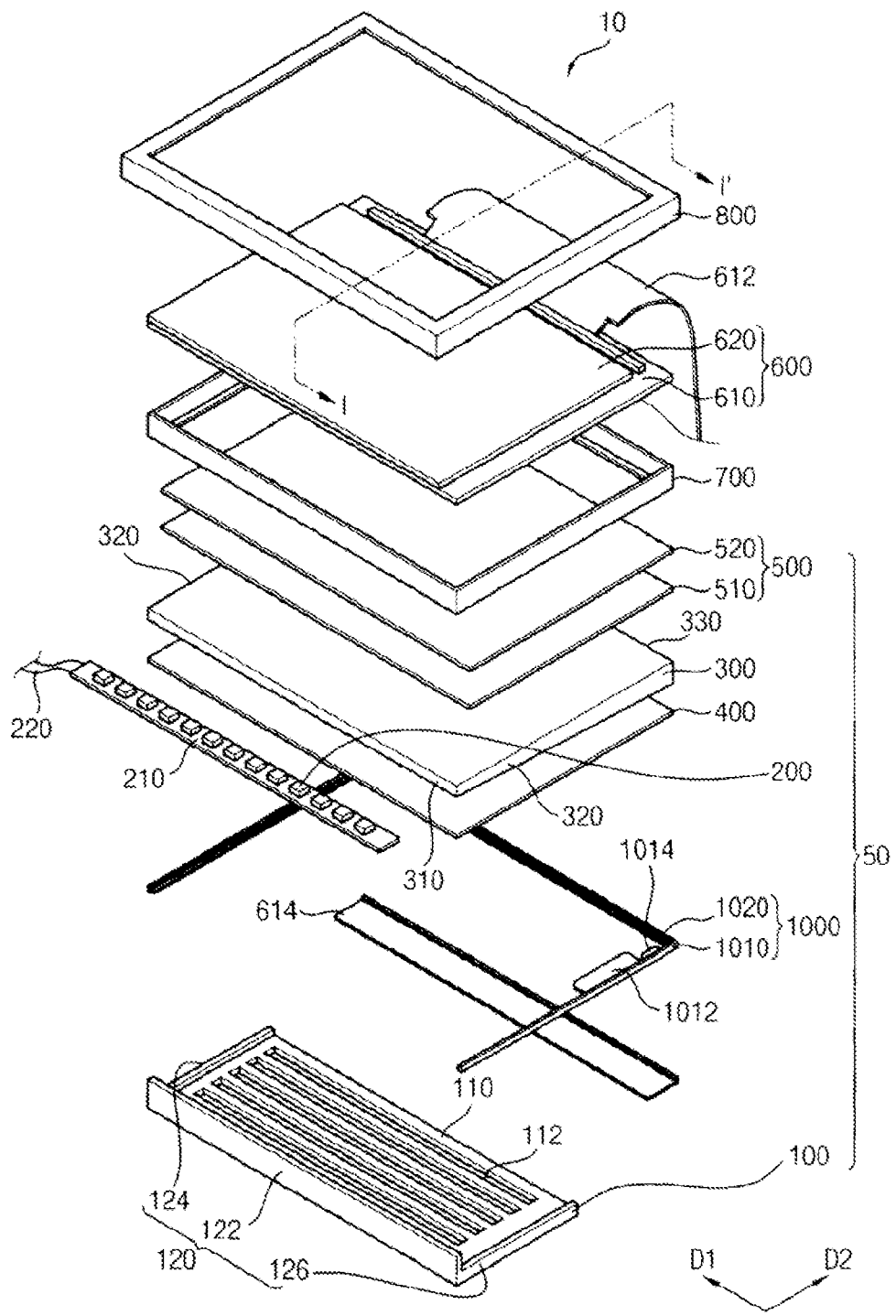
FIG. 1 is an exploded perspective view illustrating a display apparatus according to an example embodiment of the present invention.
Figure 2:
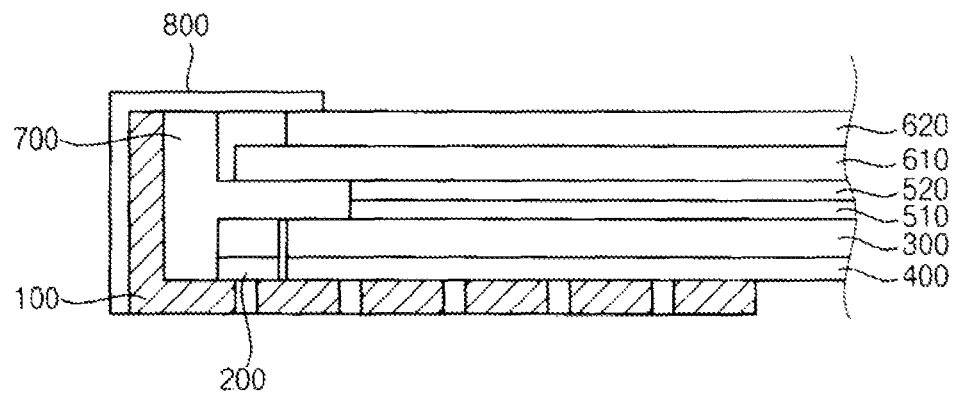
FIG. 2 is a cross-sectional view taken along line I-I' of FIG. 1.

FIG. 1 is an exploded perspective view illustrating a display apparatus according to an example embodiment of the present invention. FIG. 2 is a cross-sectional view taken along line I-I' of FIG. 1.

Referring to FIGS. 1 and 2, a display apparatus 10 according to the present example embodiment includes a backlight assembly 50, a display panel 600, a middle mold 700 and a top cover 800. The backlight assembly 50 includes a bottom receiving plate 100, a light source 200, a light guiding plate 300, a reflecting plate 400, an optical sheet 500 and a lower mold 1000.

The display panel 600 is disposed on the backlight assembly 50, and displays an image using a light provided from the backlight assembly 50 according to a driving signal and a data signal applied from an external source. The display panel 600 may include an array substrate 610, an opposite substrate 620 placed opposite to the array substrate 610, and a liquid crystal layer (not shown) disposed between the array substrate 610 and the opposite substrate 620. A chip driving the display apparatus 10 is directly mounted on a side of the array substrate 610 to drive the display panel 600. Alternatively, a flexible printed circuit board (FPC) 612 extending to an external driving circuit is formed on the side of the array substrate 610 to drive the display panel 600. The FPC 612 extends along a side of the display panel 600, covers a side of the display apparatus 10, and extends to a lower portion of the backlight assembly 50. A driving board 614 connected with the FPC 612 is disposed under the backlight assembly 50.

The middle mold 700 is disposed between the display panel 600 and the backlight assembly 50 to support the display panel 600. The middle mold 700 has a quadrilateral frame shape with an open-bottom to support edges of the display panel 600. The middle mold 700 is described to have a quadrilateral frame shape in the present example embodiment, but is not limited thereto. For example, the middle mold 700 may have a partially open-bottom, so that the middle mold 700 may support the display panel 600 more stably. The middle mold 700 may also have an X-shaped bottom, or a combed pattern shaped bottom.

The top cover 800 is disposed over the display panel 600 to cover edges of the display panel 600 and the side of the backlight assembly 50. For example, the top cover 800 has a quadrilateral frame having an L-shape bended cross-section, and has an open-top to display an image displayed on the display panel 600. A side of the top cover 800 covers a side of the FPC 612 extending from the display panel 600.

The light source 200 includes a plurality of light emitting diodes (LEDs) driven by an external power source. The LED is a point light source having the ability to direct its light substantially along a specified direction. The LEDs are mounted on the backlight assembly 50. The backlight assembly 50 may include a fixing plate 210 electrically connected to an external driving power supply through a light source driving film 220. The light source driving film 220 may extend from a side of the fixing plate 210 along a side of the bottom receiving plate 100, and be connected with an external driving part (not shown). The light source 200 is disposed at a side of the light guiding plate 300. For example, the light source 200 is disposed adjacent to a first side 310 of the light guiding plate 300.

The light guiding plate 300 changes incident light from point light sources or line light sources to an exiting light having light distributed as if from a surface light source. In other words, bright spots or lines from the light sources themselves are no longer visible to the viewer. The light guiding plate 300 includes a first side 310 to which the light source 200 is adjacent, second sides 320 extending from the first side 310, and a third side 330 opposite to the first side 310. The light guiding plate 300 may have a plate shape having a substantially uniform thickness as illustrated, but is not limited thereto. For example, the light guiding plate 300 may have a wedge shape, so that a thickness of light guiding plate gradually becomes thinner or thicker from the first side 310 to the third side 330.

The reflecting plate 400 is disposed under the light guiding plate 300 and reflects light exiting from the lower surface of the light guiding plate 300. For example, some of the light incident to the light guiding plate 300 from the light source 200 exits from a bottom of the light guiding plate 300, not from a top of the light guiding plate 300. Thus, the reflecting plate 400 reflects light exiting from the bottom of the light guiding plate 300, so that the light may instead be redirected through the top of the light guiding plate 300.

The optical sheets 500 are disposed over the light guiding plate 300, and enhance optical characteristics of the light exiting from the light guiding plate 300. As one exemplary configuration, the optical sheets 500 may include a prism sheet 510 and a diffusion sheet 520. The prism sheet 510 has a prism pattern on a surface of the prism sheet 510, and changes the direction of light exiting from the light guiding plate 300 to a direction substantially perpendicular to the light guiding plate 300. The diffusion sheet 520 diffuses the light exiting from the prism sheet 510, so that a brightness characteristic may be improved.

The lower mold 1000 is disposed under the reflecting plate 400 to support edges of the reflecting plate 400 and the light guiding plate 300. The lower mold 1000 shown has a C-shaped quadrilateral frame shape with an open-bottom to support edges of the reflecting plate 400. For example, the lower mold 1000 includes a first frame 1010 corresponding to the second side 320 of the light guiding plate 300, and a second frame 1020 corresponding to the third side 330 of the light guiding plate 300. Thus, the lower mold 1000 has a C-shape having an open-side which corresponds to the first side 310 of the light guiding plate 300. As mentioned in further detail hereinafter, the bottom receiving plate 100 has an open-side, so that the bottom receiving plate 100 partially receives the light guiding plate 300 (i.e. the bottom receiving plate 100 only partially covers the lower surface of the light guiding plate 300). Thus, the lower mold 1000 provides additional support for those portions of the light guiding plate 300 not secured by the bottom receiving plate 100.

The lower mold 1000 may further include a first sub-frame 1012 additionally supporting sides of the reflecting plate 400 and the light guiding plate 300, and a second sub-frame 1014 more stably fixing the driving board 614 under the lower mold 1000. The first and second sub-frames 1012 and 1014 extend from the first frame 1010 to an interior of the C-shape of the lower mold 1000. The first sub-frame 1012 partially supports the side of the reflecting plate 400 and the side of the light guiding plate 300. The driving board 614 is disposed under the second sub-frame 1014. The FPC 612 extends from the display panel 600 to cover the middle mold 700, the optic sheets 500, a light guiding plate 300, and sides of the lower mold 1000. The FPC 612 extends, and is connected, to a top surface of the driving board 614.

The bottom receiving plate 100 includes a bottom surface 110 and a side wall 120 extending from the bottom surface 110. An area of the bottom surface 110 is smaller than an area of the bottom of the light guiding plate 300. Thus, the bottom receiving plate 100 only partially covers the lower surfaces of the light guiding plate 300 and the reflecting plate 400. For example, the bottom receiving plate 100 receives the first side 310 of the light guiding plate 300, portions of the sides extending from the first side 310, and a portion of the bottom of the light guiding plate 300. In addition, the bottom receiving plate 100 receives part of the first frame 1010 of the lower mold 1000. Thus, a portion of the light guiding plate 300 is not covered by the bottom receiving plate 100, and remains exposed. The bottom receiving plate 100 has a minimum size and has a shape such that the bottom receiving plate 100 may stably receive the light guiding plate 300 and reflecting plate 400. That is, while not covering the entire light guiding plate 300, the bottom receiving plate 100 is still of sufficient size and coverage to securely hold the light guiding plate 300 and reflecting plate 400 Thus, a thickness or a weight of the display apparatus may be decreased. Accordingly, an area of the bottom surface 110 of the bottom receiving plate 100 may assume various shapes and sizes, to satisfy the above-mentioned conditions. For example, the area of the bottom surface 110 of the bottom receiving plate 100 may be larger than or equal to half of the area of the bottom surface of the light guiding plate 300, or smaller than half of this area.

For example, the bottom receiving plate 100 includes first and second side walls 124 and 126 formed substantially parallel to each other, and a third side wall 122 corresponding to the first side 310 of the light guiding plate 300. The light source 200 is disposed between the first side 310 of the light guiding plate 300 and the third side wall 122 of the bottom receiving plate 100, and is received, or placed, in the bottom receiving plate 100 with the light guiding plate 300. For example, the bottom receiving plate 100 receives the light source 200 and partially receives the light guiding plate 300 including the first side 310. That is, the bottom receiving plate 100 holds or contacts the entire bottom surface of light source 200, and holds or contacts only a portion of the light guiding plate 300.

A pattern of openings 112 is formed in the bottom surface 110 of the bottom receiving plate 100. The openings 112 have substantially uniform size and shape, and are uniformly arranged through the bottom receiving plate 100. For example, each of the openings 112 has a generally rectangular shape extending along a first direction D1 that is substantially parallel to the third side wall 122 of the bottom receiving plate 100. The openings 112 are formed side by side and separated by a uniform distance along a second direction D2 that is substantially perpendicular to the first direction D1. The invention contemplates any sizes of the openings 112 and any distances between the openings 112. For example, sizes of the openings 112 and distances between the openings 112 may be changed according to an amount of heat generated by the light source 200.

Generally, the bottom receiving plate 100 is metal, or includes a metal. Thus, the heat generated by the light source 200 is conducted from the third side wall 122 of the bottom receiving plate 100 to the remainder of the bottom receiving plate 100. During operation, the temperature of the plate 100 increases approaching the third side wall 122, and decreases with distance from the third side wall 122. In addition, the temperature is different between the area of the backlight assembly 50 in which the bottom surface 110 is disposed and the area in which the bottom surface 110 is not disposed. However, according to the present example embodiment, the heat generated from the light source 200 may be more efficiently dissipated to via the openings 112 formed through the bottom surface 110, which provide a heat transfer path to the external surroundings. Thus, the temperature of the bottom surface 110 may have a more uniform distribution, so that the temperature at the boundary of the bottom surface 110 may be more uniformly maintained.

As mentioned above, the bottom receiving plate 100 has the plurality of openings 112 having a substantially uniform pattern, so that heat may be more efficiently dissipated. In addition, the size of the opening 112 and the distance between the openings 112 may be changed according to the amount of heat generated by the light source 200 and the total size of the display apparatus 10, so that the temperature may be more uniformly maintained as between the area in which the bottom surface 110 is disposed and the area in which the bottom surface 110 is not disposed.

As above, the sizes and shapes of the openings 112 are not limited to the present example embodiment. The sizes of the openings 112 and the distances between the openings 112 may be changed according to the amount of heat generated by the light source 200 and an overall stiffness of the display apparatus 10. Hereinafter, additional example embodiments are explained in detail referring to FIGS. 2 to 6.

In addition, the light source 200 is disposed adjacent to the first side 310, which is a relatively longer side of the light guiding plate 300 in the present example embodiment. However, the embodiments of the invention are not limited thereto. For example, the light source 200 may be disposed adjacent to the second side 320 which is a relatively shorter side of the light guiding plate 300 (or to any other side). In this case, an overall structure is substantially the same as that of the backlight assembly 50, except that the third side wall 122 of the bottom receiving plate 100 is formed and positioned to correspond to the second side 320.

As mentioned above, according to the present example embodiment, the backlight assembly 50 includes a bottom receiving plate 100 having a plurality of openings having a uniform pattern, so that the heat generated from the light source 200 may be more efficiently dissipated, and more uniform brightness may be maintained.

In addition, the light guiding plate 300 and other structures are more efficiently received and supported by the bottom receiving plate 100, and the total size and weight of the display apparatus 10 may also be reduced.

Figure 3:
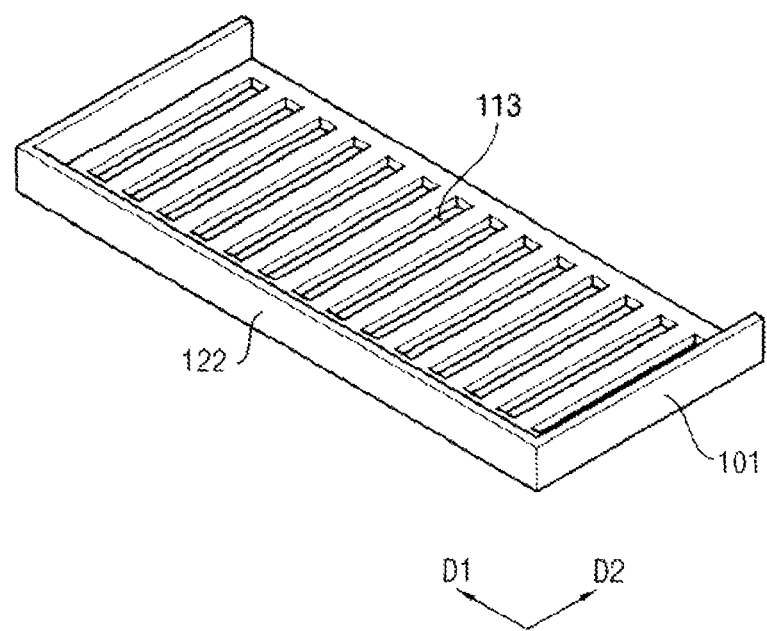
FIG. 3 is a perspective view illustrating a bottom receiving plate according to another example embodiment of the present invention.

FIG. 3 is a perspective view illustrating a bottom receiving plate according to another example embodiment of the present invention. The bottom receiving plate 101 according to the present example embodiment is substantially the same as the bottom receiving plate 100 illustrated in FIG. 1, except that each of the openings 113 has a generally rectangular shape whose longer sides (or major axes) are oriented substantially perpendicular to the third side wall 122 of the bottom receiving plate 101. Hereinafter, the same reference numerals will be used to refer to the same or like parts as those described in FIG. 1, and any repetitive explanation concerning the above elements will be largely omitted.

Referring to FIG. 3, the bottom receiving plate 101 has openings 113 each of which has a rectangular shape whose longer sides extend along the second direction D2 substantially perpendicular to the third side wall 122. The rectangular shaped openings 113 have uniform size and shape, and are uniformly arranged through the bottom receiving plate 101.

The bottom receiving plate 101 has openings 113 having a rectangular shape substantially perpendicular to the third side wall 122, so that the bottom receiving plate 101 more efficiently supports the parts disposed on the bottom receiving plate 101 when a load along the second direction D2 is larger than a load along the first direction D1. In addition, heat generated by the light source 200 may be more efficiently dissipated.

Figure 4:
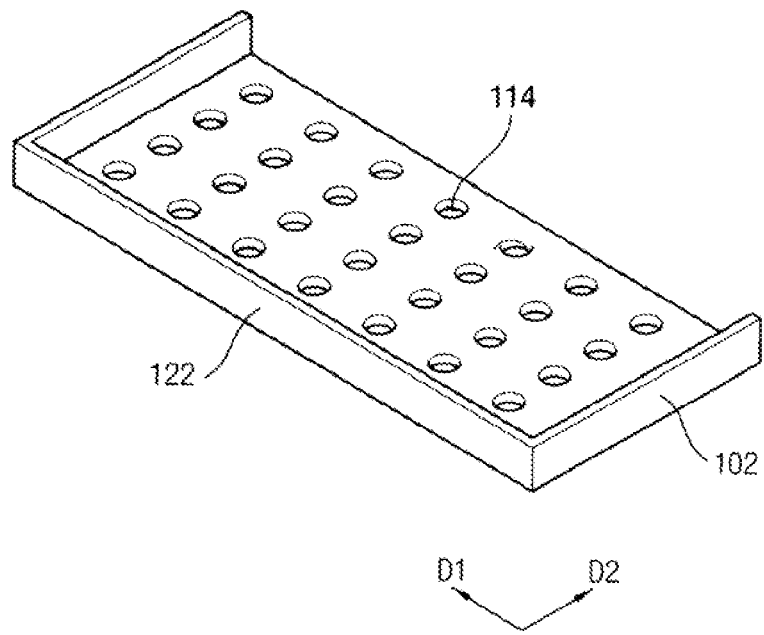
FIG. 4 is a perspective view illustrating a bottom receiving plate according to still another example embodiment of the present invention.

FIG. 4 is a perspective view illustrating a bottom receiving plate according to still another example embodiment of the present invention. The bottom receiving plate 102 according to this example embodiment is substantially the same as the bottom receiving plate 100 illustrated in FIG. 1, except that each of openings 114 has a substantially circular shape. Hereinafter, the same reference numerals will be used to refer to the same or like parts as those described in FIG. 1, and any repetitive explanation concerning the above elements will be largely omitted.

Referring to FIG. 4, the bottom receiving plate 102 has openings 114 each of which has a substantially circular shape. The circular shaped openings 114 have substantially uniform size and shape, and are uniformly arranged through the bottom receiving plate 102.

The substantially circular openings 114 allow the bottom receiving plate 102 to efficiently and uniformly support the parts disposed thereon in all directions. In addition, a heat generated from the light source 200 may be more efficiently dissipated.

Figure 5:
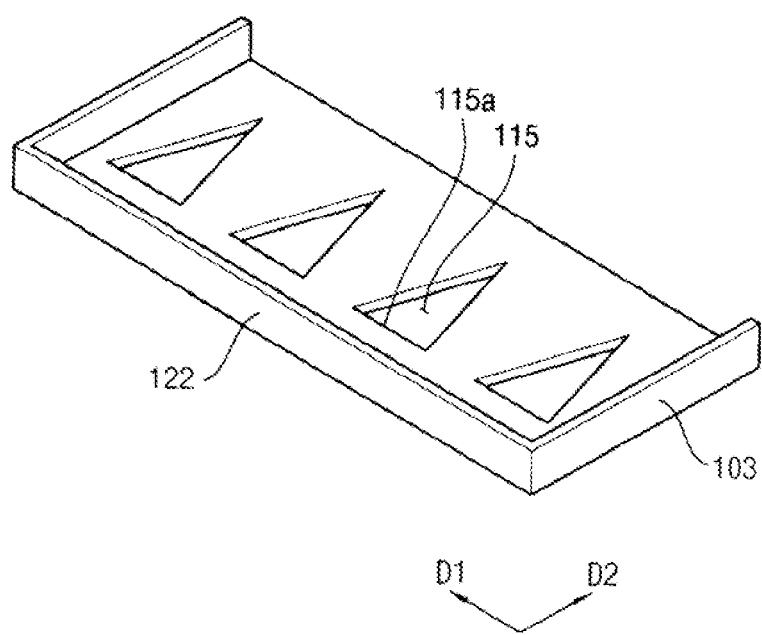
FIG. 5 is a perspective view illustrating a bottom receiving plate according to still another example embodiment of the present invention.

FIG. 5 is a perspective view illustrating a bottom receiving plate according to still another example embodiment of the present invention. The bottom receiving plate 103 according to this example embodiment is substantially the same as the bottom receiving plate 100 illustrated in FIG. 1, except that each of openings 115 has a substantially triangular shape. Hereinafter, the same reference numerals will be used to refer to the same or like parts as those described in FIG. 1, and any repetitive explanation concerning the above elements will be largely omitted.

Referring to FIG. 5, the bottom receiving plate 103 has openings 115 each of which has a substantially triangular shape. The triangular shaped openings 115 have substantially uniform size and shape, and are uniformly arranged through the bottom receiving plate 103. For example, the opening 115 has a generally isosceles triangular shape, and a bottom side 115a of each isosceles triangle shape is substantially parallel with the third side wall 112 of the bottom receiving plate 103. Therefore, a size of each of the openings becomes smaller with distance from the third side wall 112 of the bottom receiving plate 103. That is, the area of each triangle becomes smaller along the second direction D2. As above, temperature is greatest near the third side wall 112, and decreases with distance from side wall 112. Therefore, the openings 115 have an isosceles triangle shape, and the size of each of the openings 115 becomes smaller farther from the third side wall 112 along the second direction D2, so that an amount of the heat dissipated in an area adjacent to the third side wall 122 is greater than that in an area farther from the third side wall 122. Thus, heat may be more uniformly dissipated, and the temperature may be more uniformly maintained between the area in which the bottom receiving plate 103 is disposed and an area in which the bottom receiving plate 103 is not disposed. Thus, the bottom receiving plate 103 may provide a more efficient and thermally uniform receiving space. In addition, the heat generated by the light source 200 may be more efficiently dissipated.

Figure 6:
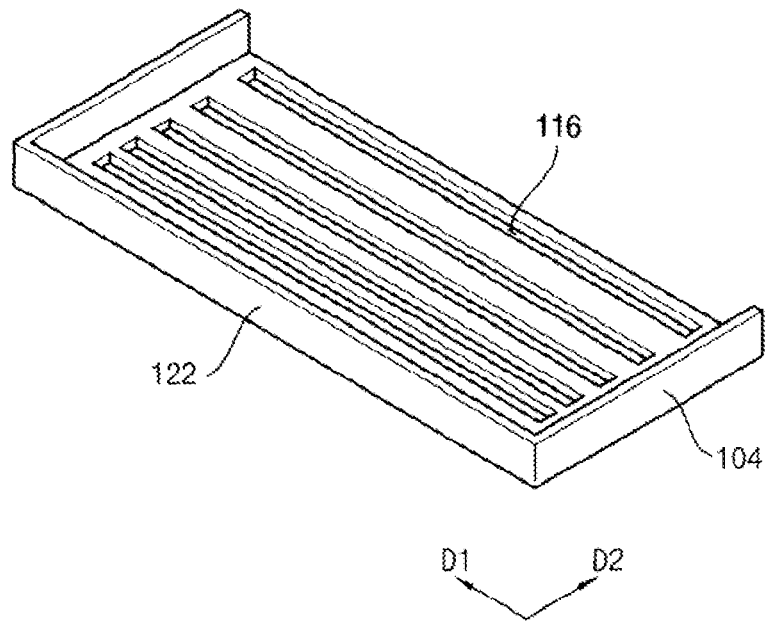
FIG. 6 is a perspective view illustrating a bottom receiving plate according to still another example embodiment of the present invention.

FIG. 6 is a perspective view illustrating a bottom receiving plate according to still another example embodiment of the present invention. The bottom receiving plate 104 according to this example embodiment is substantially the same as the bottom receiving plate 100 illustrated in FIG. 1, except that a distance between the openings 116 becomes larger with distance from the third side wall 122 of the bottom receiving plate 104. Hereinafter, the same reference numerals will be used to refer to the same or like parts as those described in FIG. 1, and any repetitive explanation concerning the above elements will be largely omitted.

Referring to FIG. 6, the bottom receiving plate 104 has the openings 116 each of which has a substantially rectangular shape with its longer edges extending along the first direction D1 substantially parallel with the third side wall 122 of the bottom receiving plate 104. The openings 116 have substantially uniform size and shape, and are not uniformly spaced across the bottom receiving plate 104. For example, the distance between the openings 116 in the second direction D2 increases with distance from the third side wall 112. Thus, the density of the openings 116 becomes smaller with distance from the third side wall 112. As above, the temperature of the bottom receiving plate 104 decreases with distance from the third side wall 112. Similarly, the size of each of the openings 116 decreases with distance from the third side wall 112 of the bottom receiving plate 104, so that the amount of heat dissipated in an area adjacent the third side wall 122 is larger than that in an area farther from the third side wall 122. Thus, the heat may be more uniformly dissipated, and the heat generated from the light source 200 may be efficiently dissipated. It should be noted that the invention encompasses configurations in which either the size of the openings 116, or the distance between the openings 116, or both, decreases with distance from third side wall 112.

This general pattern of opening density that decreases with distance from wall 112 may be applied to other-shaped openings. For example, it may be applied to the previous example embodiment illustrated in FIG. 3. Thus, when each opening has a substantially circular shape, the density of the openings become smaller farther from the light source, so that heat may be more uniformly dissipated and more uniform brightness may be maintained. In addition, the above-mentioned arrangement may be applied to various other kinds of opening shapes.

Figure 7:
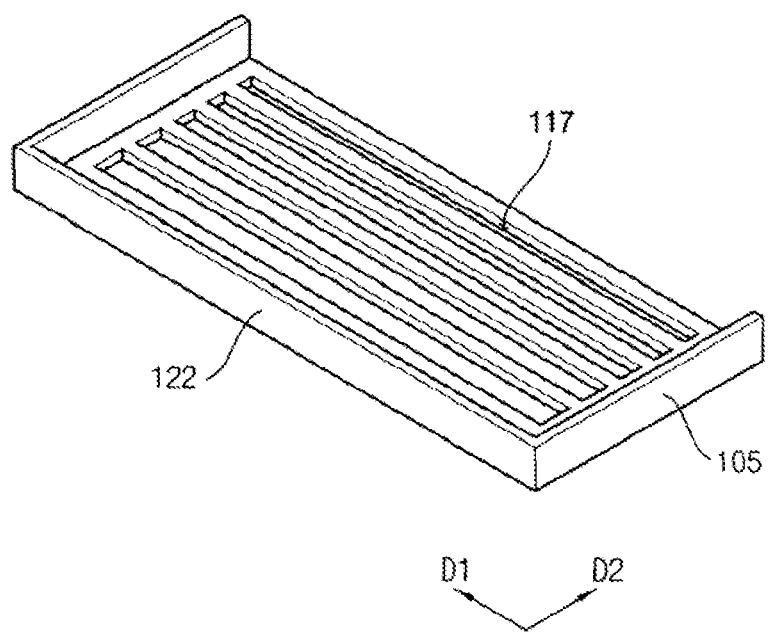
FIG. 7 is a perspective view illustrating a bottom receiving plate according to still another example embodiment of the present invention.

FIG. 7 is a perspective view illustrating a bottom receiving plate according to still another example embodiment of the present invention. The bottom receiving plate 105 of this example embodiment is substantially the same as the bottom receiving plate 100 illustrated in FIG. 1, except that openings 117 have sizes different from each other. Hereinafter, the same reference numerals will be used to refer to the same or like parts as those described in FIG. 1, and any repetitive explanation concerning the above elements will be largely omitted.

Referring to FIG. 7, each of the openings 117 has a substantially rectangular shape with its longer edges extending along the second first direction D1 substantially parallel with the third side wall 122 of the bottom receiving plate 105. The openings 117 have the same shapes but have sizes different from each other. For example, a width of each of the openings 117 becomes larger closer to the third side wall 122 of the bottom receiving plate 105. Thus, a size of each of the openings 117 decreases with distance from the third side wall 122. Accordingly, heat dissipated in an area adjacent to the third side wall 122 is larger than that in an area far from the third side wall 122. Therefore, heat may be more uniformly dissipated and more uniform brightness may be maintained.

This general pattern of opening size that decreases with distance from wall 112 may be applied to other-shaped openings. For example, it may be applied to the previous example embodiment illustrated in FIG. 3. Thus, when each opening has a substantially circular shape, the size of each of the openings becomes smaller farther from the light source, so that heat may be more uniformly dissipated and more uniform brightness may be maintained. In addition, the above-mentioned arrangement may be applied to various kinds of opening shapes.

In addition, other opening shapes are contemplated. For example, the shape of the opening may be an ellipse, a semicircle and etc.

Figure 8:
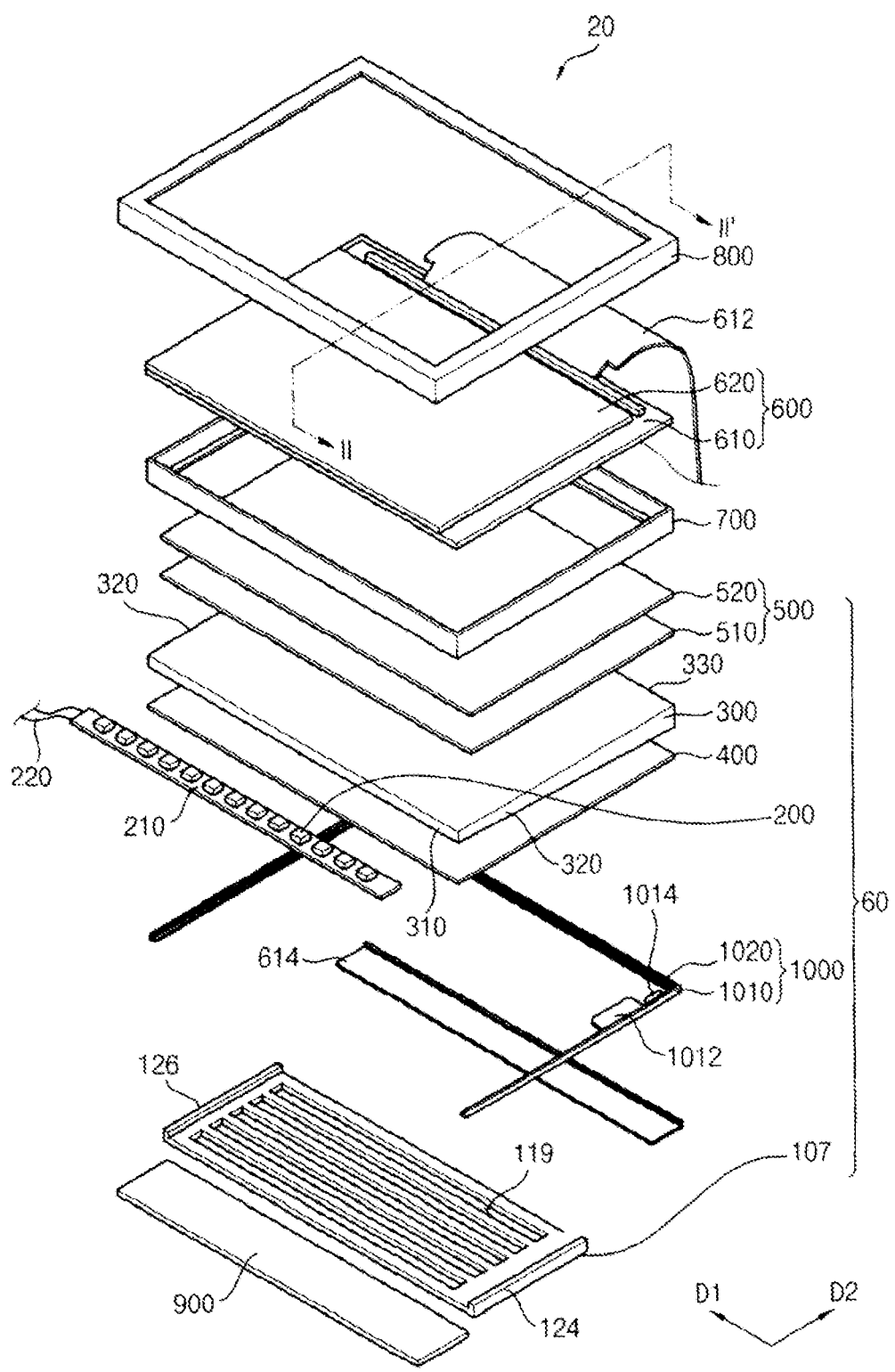
FIG. 8 is a exploded perspective view illustrating a display apparatus according to another example embodiment of the present invention.
Figure 9:
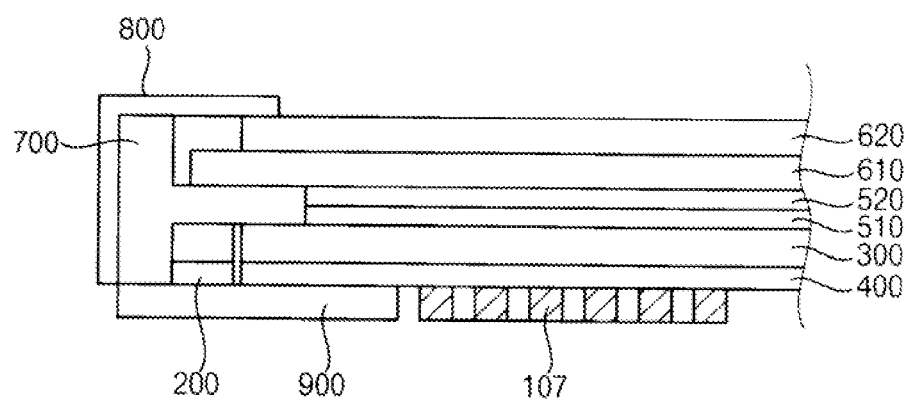
FIG. 9 is a cross-sectional view taken along line II-II' of FIG. 8.

FIG. 8 is an exploded perspective view illustrating a display apparatus according to another example embodiment of the present invention. FIG. 9 is a cross-sectional view taken along line II-II' of FIG. 8. The display apparatus 20 of this example embodiment is substantially the same as the display apparatus illustrated in FIG. 1, except for a shape of the bottom receiving plate 107. Hereinafter, the same reference numerals will be used to refer to the same or like parts as those described in FIG. 1, and any repetitive explanation concerning the above elements will be largely omitted.

Referring to FIGS. 8 and 9, the bottom receiving plate 107 includes a bottom surface 110 and a side wall 120 extending from the bottom surface 110, and a size of the bottom surface 110 is smaller than a size of the bottom of the light guiding plate 300.

For example, the bottom receiving plate 107 includes a first side wall 124 and a second side wall 126 that are substantially parallel with each other. Thus, a cross-section of the bottom receiving plate 107 has a general C-shape with an open-top portion. A first side 310 of the light guiding plate 300 is exposed to the outside (i.e., its surroundings), and the bottom receiving plate 107 partially covers the bottom of the light guiding plate 300. Considering overall stability of a backlight assembly 60, the bottom receiving plate 107 may receive a central area of the bottom of the light guiding plate 300, i.e., the plate 107 may cover only a middle portion of the lower surface of the light guiding plate 300, not covering either of edges 310 and 330, instead leaving them exposed. Thus, a first side 310 of the light guiding plate 300, an opposite side 330 opposite to the first side 310, and the light source 200 are exposed to the outside. The bottom receiving plate 107 may be formed as the smallest size in a range in which the light guiding plate 300 and the reflecting plate 400 may be stably received in the bottom receiving plate 107, so that thickness and weight of the display apparatus 20 may be reduced. In other words, the bottom receiving plate 107 can be made as small as possible, while still reliably supporting the light guiding plate 300 and reflecting plate 400. In addition, a size of the bottom surface 110 of the bottom receiving plate 107 may be variously changed. For example, a size of the bottom surface 110 of the bottom receiving plate 107 may be larger than or equal to a half of the size of the bottom of the light guiding plate 300, or smaller than a half of the size of the bottom of the light guiding plate 300.

A plurality of openings 119 having a substantially uniform pattern is formed through the bottom surface 110 of the bottom receiving plate 107. The openings 119 have uniform size and shape, and are uniformly formed through the bottom receiving plate 100. For example, each of the openings 119 has a substantially rectangular shape with its longer sides extending along the first direction D1. The rectangular openings 119 are formed along the second direction D2 separated by a substantially uniform distance from each other. However, sizes of the openings 119 and distances between the openings 119 may take on any suitable value or values, including non-uniform values.

A shape of the openings 119 is not limited to the present example embodiment. For example, the shapes of the openings illustrated in FIGS. 3 to 7 may be applied to the shape of the openings 119 according to the present example embodiment.

The display apparatus 20 may further include a fixing film 900 fixing the light source 200 and the reflecting plate 400. The fixing film 900 is disposed under the light source 200 and the reflecting plate 400 and is disposed in an area in which the bottom receiving plate 107 is not disposed. That is, the fixing film 900 is positioned to the side of the bottom receiving plate 107, without overlapping it. The fixing film 900 fixes a side of the reflecting plate 400 adjacent to the light source 200. Thus, even though the light source 200 is not received in the bottom receiving plate 107, the light source 200 may be fixed at the first side 310 of the light guiding plate 300.

As mentioned above, the bottom receiving plate is disposed to receive the central portion of the light guiding plate, so that heat transfer from the light source is reduced, and the temperature may be more uniformly maintained along the entire area of the display apparatus.

In addition, a pattern of openings is formed through the bottom receiving plate, so that the light guiding plate may be received, yet heat may be more uniformly dissipated, and more uniform brightness may be maintained.

As mentioned above, according to the present example embodiments, a backlight assembly includes a bottom receiving plate having a plurality of openings having a pattern in a bottom surface, so that heat transmission from the light source may be reduced and more uniform brightness may be maintained.

In addition, the light guiding plate and other structures are more efficiently supported by the bottom receiving plate, and total size and weight of the display apparatus may be reduced at the same time.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A backlight assembly comprising:
   a light guiding plate;
   a bottom receiving plate comprising a bottom surface and a side wall to form a receiving space in which at least a portion of the light guiding plate is placed, and having a plurality of openings formed through the bottom surface, the side wall extending from the bottom surface; and
   a light source disposed between the side wall of the bottom receiving plate and a first side of the light guiding plate, and received in the receiving space.

2. The backlight assembly of claim 1, wherein each of the openings has a substantially same size and shape, and are uniformly arranged through the bottom receiving plate.

3. The backlight assembly of claim 2, wherein sizes of each of the openings decrease with distance from the light source.

4. The backlight assembly of claim 1, wherein each of the openings has a substantially same size and shape, and are irregularly arranged through the bottom receiving plate.

5. The backlight assembly of claim 4, wherein a density of the openings decreases with distance from the light source.

6. The backlight assembly of claim 4, wherein distances between the openings increase with distance from the light source.

7. The backlight assembly of claim 1, wherein ones of the openings have sizes different from each other and have a substantially same shape.

8. The backlight assembly of claim 7, wherein sizes of each of the openings decrease with distance from the light source.

9. The backlight assembly of claim 1, wherein each opening has one of a quadrilateral shape, a triangular shape, a circular shape and an elliptic shape.

10. The backlight assembly of claim 1, wherein the side wall of the bottom receiving plate comprises a first side wall and a second side wall oriented substantially parallel to the first side wall.

11. The backlight assembly of claim 1, wherein the light source comprises a fixing plate extending along the first side of the light guiding plate, and a plurality of light emitting diodes disposed on the fixing plate.

12. The backlight assembly of claim 11, wherein the fixing plate is disposed directly on the bottom surface of the bottom receiving plate.

13. The backlight assembly of claim 12, wherein the light source further comprises a light source driving film extending from a side of the fixing plate along a side of the bottom receiving plate.

14. The backlight assembly of claim 1, wherein the side wall of the bottom receiving plate comprises a first side wall, a second side wall oriented substantially parallel to the first side wall, and a third side wall facing the first side of the light guiding plate.

15. The backlight assembly of claim 14, wherein at least portions of the light source and the first side of the light guiding plate are positioned in the receiving space.

16. The backlight assembly of claim 15, wherein an area of the bottom surface of the bottom receiving plate is less than half of an area of the lower surface of the light guiding plate.

17. The backlight assembly of claim 1, further comprising:
    an optical sheet disposed over the light guiding plate; and
    a reflecting plate disposed between the light guiding plate and the bottom surface of the bottom receiving plate.

18. The backlight assembly of claim 17, further comprising a bottom mold disposed between the reflecting plate and the bottom receiving plate and supporting a boundary of the reflecting plate.

19. The backlight assembly of claim 1, wherein the bottom surface of the bottom receiving plate is smaller than a lower surface of the light guiding plate.

20. A display apparatus comprising:
    a display panel configured to display an image;
    a backlight assembly comprising:
       a light guiding plate;
       a bottom receiving plate comprising a bottom surface and a side wall to form a receiving space in which at least a portion of the light guiding plate is placed, the bottom surface being smaller than a lower surface of the light guiding plate and having a plurality of openings formed through the bottom surface; and
       a light source disposed between the side wall of the bottom receiving plate and a first side of the light guiding plate, and received in the receiving space; and
    a middle mold disposed between the display panel and the backlight assembly, the middle mold supporting the display panel.

* * * * *